United States Patent [19]

Hayes

[11] 4,096,448
[45] Jun. 20, 1978

[54] PHASE-LOCKING OF INDEPENDENT LASER OSCILLATORS

[75] Inventor: Cecil L. Hayes, Placentia, Calif.

[73] Assignee: Rockwell International Corporation, El Segundo, Calif.

[21] Appl. No.: 758,626

[22] Filed: Jan. 12, 1977

[51] Int. Cl.² .............................................. H01S 3/098
[52] U.S. Cl. ........................ 331/94.5 ML; 331/94.5 C
[58] Field of Search ...................... 331/94.5 C, 94.5 D, 331/94.5 ML, 94.5 S; 356/106 R

[56] References Cited

U.S. PATENT DOCUMENTS

| | | | |
|---|---|---|---|
| 3,437,955 | 4/1969 | Enloe et al. | 331/94.5 S |
| 3,471,803 | 10/1969 | Forster | 331/94.5 S |
| 3,877,813 | 4/1975 | Hayes et al. | 356/106 R |

Primary Examiner—William L. Sikes
Attorney, Agent, or Firm—L. Lee Humphries; H. Fredrick Hamann; Rolf M. Pitts

[57] ABSTRACT

In a multi-element array of laser oscillators, each having a control input for adjusting the output laser light frequency thereof, apparatus for phase and frequency locking each laser oscillator of the array to a reference laser oscillator. An optical phase shifter cooperates with the reference laser oscillator and with a radio frequency source to provide a local oscillator energy source. Mixing of the local oscillator energy with that of a respective one of the array oscillators by photodetector and then phase detection of the mixed or down-converted signals, relative to the radio frequency source, provides a control signal for phase and frequency control of the array oscillator.

7 Claims, 2 Drawing Figures

PHASE-LOCKING OF INDEPENDENT LASER OSCILLATORS

BACKGROUND OF THE INVENTION

The application of coherent adaptive optical systems for target tracking has been described in U.S. Pat. No. 3,877,813 issued to Cecil L. Hayes et al for Self-Compensating Interferometer. In such application, a single transmitting laser oscillator and associated optics cooperate to provide a multiple beam laser system array as a large near-field aperture to provide a narrow far-field beam. In this way, a maximum concentration of energy per unit area is provided for illumination of reflective targets of minimum size or at maximum range, as is well understood in the art. It is also understood that the effectiveness of such array requires a preselected phase distribution across the near-field aperture defined by such array. Focusing or aperture distribution control of the multiple beams comprising the composite beam of such array is achieved by discrete phase adjustment of the separate optics employed for each transmitted beam comprising the array. In the system disclosed in the above-noted U.S. Pat. No. 3,877,813, in which the same aperture optics serves as both transmitter of illumination and receiver of target reflections thereof, phase shifters in the optical paths of the multiple beam optics are compensatorily adjusted to reduce the detected phase difference between a reference received beam and each of the other received beams. In this way, the multiple beams transmitted by such optics are also adjusted so as to achieve such focusing. A second type of compensatory phase-distribution control for a sub-aperture, multiple beam transmitter employing a single transmitter laser oscillator, but employing a separate and single receiving optical element, is shown in FIG. 3 of U.S. Pat. No. 3,731,103 issued to O'Meara for Adaptive Arrays, while the use of a separate array of receiver beam splitters and single local oscillator for phase front adjustment of an array of receiving optics is shown by FIG. 5 of such latter reference.

In a case requiring increased illumination of the target or detection thereof at increased ranges, an array of several transmitting laser oscillators, each with its own multiple beam optics, may be desired. In other words, that focusing upon and tracking of a target described in U.S. Pat. No. 3,877,813 may call for a plurality of the systems described in such patent to describe the overall system aperture, the multiple beams of each system comprising a sub-aperture thereof. Although the multiple beams of each such transmitting laser or subsystem may be mutually phase-tracking, yet the separate subapertures defined by the separate multiple beam subsystem may not be mutually phase-tracking, but instead are subject to the differential phase-drift or randomness among the separate laser transmitters for such separate multiple beam subsystems.

SUMMARY OF THE INVENTION

By means of the concept of the present invention, a plurality of independent laser oscillators are mutually phase-locked for large-aperture cooperation in a target illumination and tracking system.

In a preferred embodiment of the invention there is provided a master laser oscillator and an optical frequency shifter in cooperation with the master oscillator and with a radio frequency source as a local oscillator. There is further provided a like number of photodetectors as transmitting laser oscillators, each photodetector mixing the energies of the local oscillator and a respective one of the laser oscillators. A phase comparator responsive to phase difference between the detector output and the RF source provides a control signal output which is employed to slave or phase-lock the laser oscillator to the master oscillator.

Thus, in ordinary operation of the overall system contemplated by the invention, all laser oscillators are frequency-and-phase locked to the master oscillator, as to reduce phase-tracking among the several subapertures represented by and associated with such slaved laser oscillators. Also, because such laser oscillators are so slaved, the control authority of the self-adaptive tracking optics for each sub-array is not compromised either by the absence of such laser slaving or by attempting to compensate for it in addition to the usual self-adaptive control function.

Accordingly, it is an object of the invention to provide an improved means for efficiently coupling coherent adaptive optical tracking systems into larger more effective arrays.

It is another object to provide effective means of frequency-and-phase locking several independent laser oscillators.

These and other objects of the invention will become apparent from the following description, taken together with the accompanying drawings in which:

BRIEF DESCRIPTION OF THE FIGURES

In the figures, like reference characters refer to like parts.

DESCRIPTION OF THE PREFERRED EMBODIMENT

Figure 1:
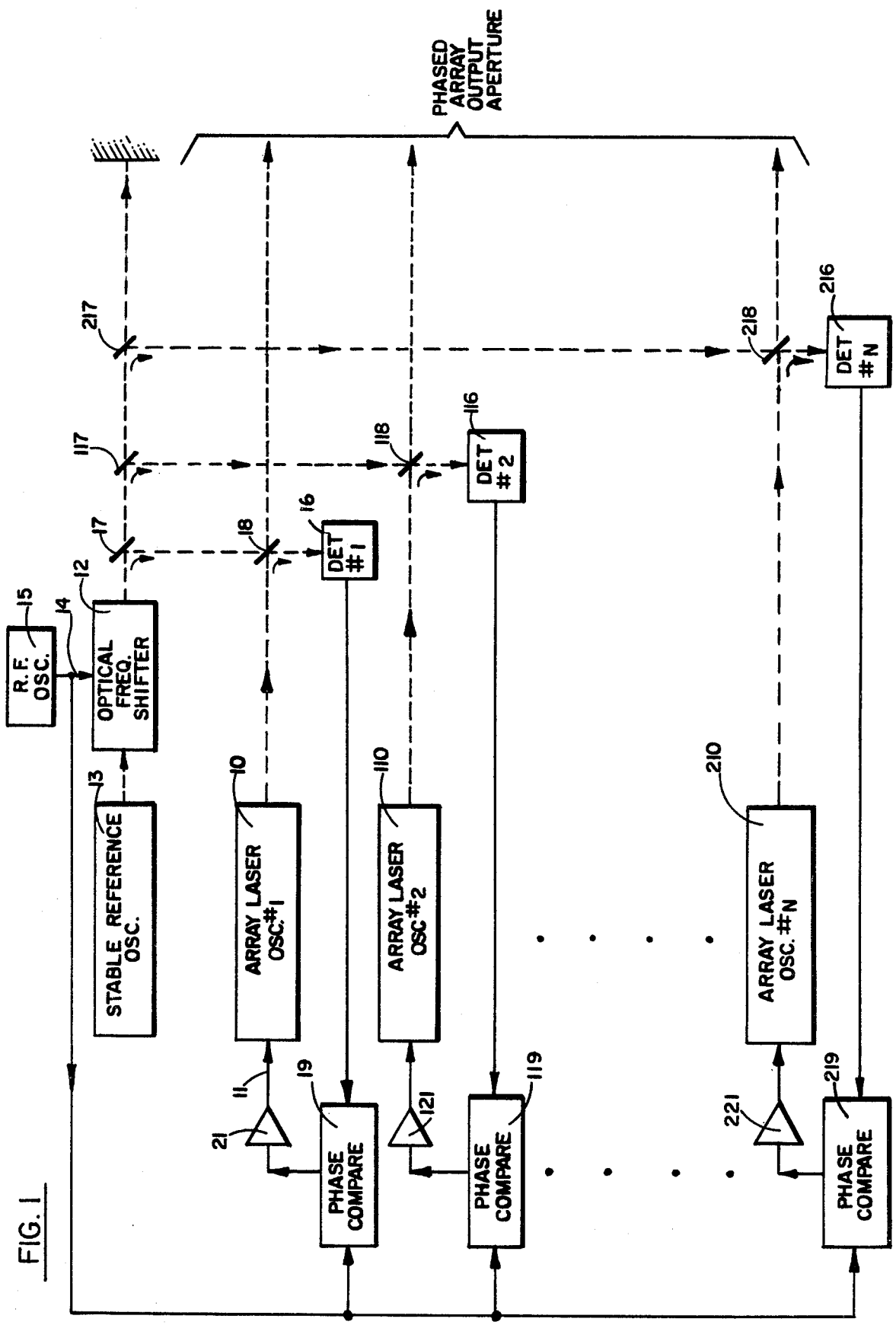
FIG. 1 is a block diagram of an exemplary arrangement of the inventive concept.

Referring now to FIG. 1 there is illustrated in block diagram form an exemplary arrangement of the inventive concept for phase and frequency locking a laser oscillator to as master or reference laser beam. There is provided a controllable laser oscillator 10 having a control input 11 for adjusting the operating or output laser light frequency thereof. There is also provided an electronically controlled light beam frequency shifter 12 interposed in the optical path of the reference laser beam (provided by reference laser 13) and having a control input 14 responsively coupled to the output of a radio frequency oscillator 15.

A photoelectric detector 16 cooperates with a beam-splitting and reflective optics system (elements 17 and 18) as to be responsive to energy samples of the outputs of both master laser 13 and controllable laser oscillator 10. A phase comparator 19 responsive to the lower side band of the output of detector 16 has a second input 14 responsively coupled to the output of RF source 15. The output of comparator 19 is drivingly coupled to the control input 11 of controllable laser oscillator 10 by means of an amplifier 21.

In normal operation of the above-described arrangement, the two laser inputs (from lasers 10 and 13) are mixed at detector 16. In other words, the non-linear electrical output response of detector 16 to light energy levels falling thereon causes a mixing of the energy frequencies or production of beat frequencies corresponding to the difference between the input energy frequencies. (Response limitations prevent a response to the sums of such light energy frequencies.) The function of a non-linear detector as a mixer is known in the art, being illustrated for example as element 13 in FIG. 1 of U.S. Pat. No. 3,745,578 issued to Carl Barrett et al for Multiple Frequency Radar System Having Improved Response to Small Targets and is also described in U.S. Pat. No. 3,877,813 issued to Cecil L. Hayes et al for Self-Compensating Interferometer. The lower side band output of the mixer-detector 16 can be demonstrated to be equal to the phase difference and frequency difference of the two components of the applied input thereof:

Let:
$e^{(j\omega_{LO}t + \phi_{LO})}$ = phasor of local oscillator output
$e^{(j\omega_1 t + \phi_1)}$ = phasor of slave laser oscillator Where:
$\omega_{LO}$ = local oscillator frequency ($\omega_s + \omega_o$)
$\omega_1$ = frequency of the salved laser oscillator
$\phi_{LO}$ = phase of local oscillator signal relative to the reference oscillator (e.g., phase of IF radio oscillator relative to reference oscillator)
$\phi_1$ = phase of slaved oscillator relative to the reference oscillator Then, the phasor of the lower sideband output of the mixer detector 16 is the vector sum of such phasors:

$$e^{j(\omega_{LO}t+\phi_{LO})} \times e^{j(\omega_1 t+\phi_1)} = e^{j[(\omega_{LO}-\omega_1)t+(\phi_{LO}-\phi_1)]}$$

The phase detection of the mixer-detector output relative to the radio frequency source ($\omega_o$) by phase comparator 19 will itself be another phasor:

$$e^{j[(\omega_{LO}-\omega_1)t+(\phi_{LO}-\phi_1)]} \times e^{j(\omega_o t+\phi_{LO})} = e^{j[(\omega_{LO}-\omega_o-\omega_1)t+(\phi_{LO}-\phi_{LO}-\phi_1)]}$$

Recalling that $$\omega_{LO} = \omega_s + \omega_o$$

and simplifying the output phasor for comparator 19 may be written:

$$e^{j[(\omega_{LO}-\omega_1)t+(\phi_{LO}-\phi_1)]} \times e^{j(\omega_o t+\phi_{LO})} = e^{j[(\omega_s-\omega_1)t-\phi_1]}$$

Accordingly, the output phasor of comparator 19 has a frequency and phase corresponding to the frequency and phase differences between the reference and slaved lasers 13 and 10 as to be effective in compensatorily controlling the slaved oscillator 10 in such a sense as to reduce the frequency and phase differences to zero. A further exposition of the translation of phase information via frequency conversion systems is to be found at lines 17–60 in column 7 of U.S. Pat. No. 3,450,869 issued to C. A. Wiley for High Sensitivity Unambiguous Correlator.

There is further shown in the arrangement of FIG. 1 a plurality of additional laser oscillators 110 and 210 all arranged to correspond with master or reference oscillator 13 in the same manner as first array oscillator 10. Thus, oscillators 10, 110 and 210 comprise an array of laser oscillators phase-and-frequency locked to reference oscillator 13 as to comprise a co-phasal array or output aperture as to energy transmitted therefrom via beam splitter 18, 118 and 218, respectively, as a respective first, second and last optical channel. In this way, a peak amount of the energy developed is enabled to be directed toward a target for illumination thereof.

Figure 2:
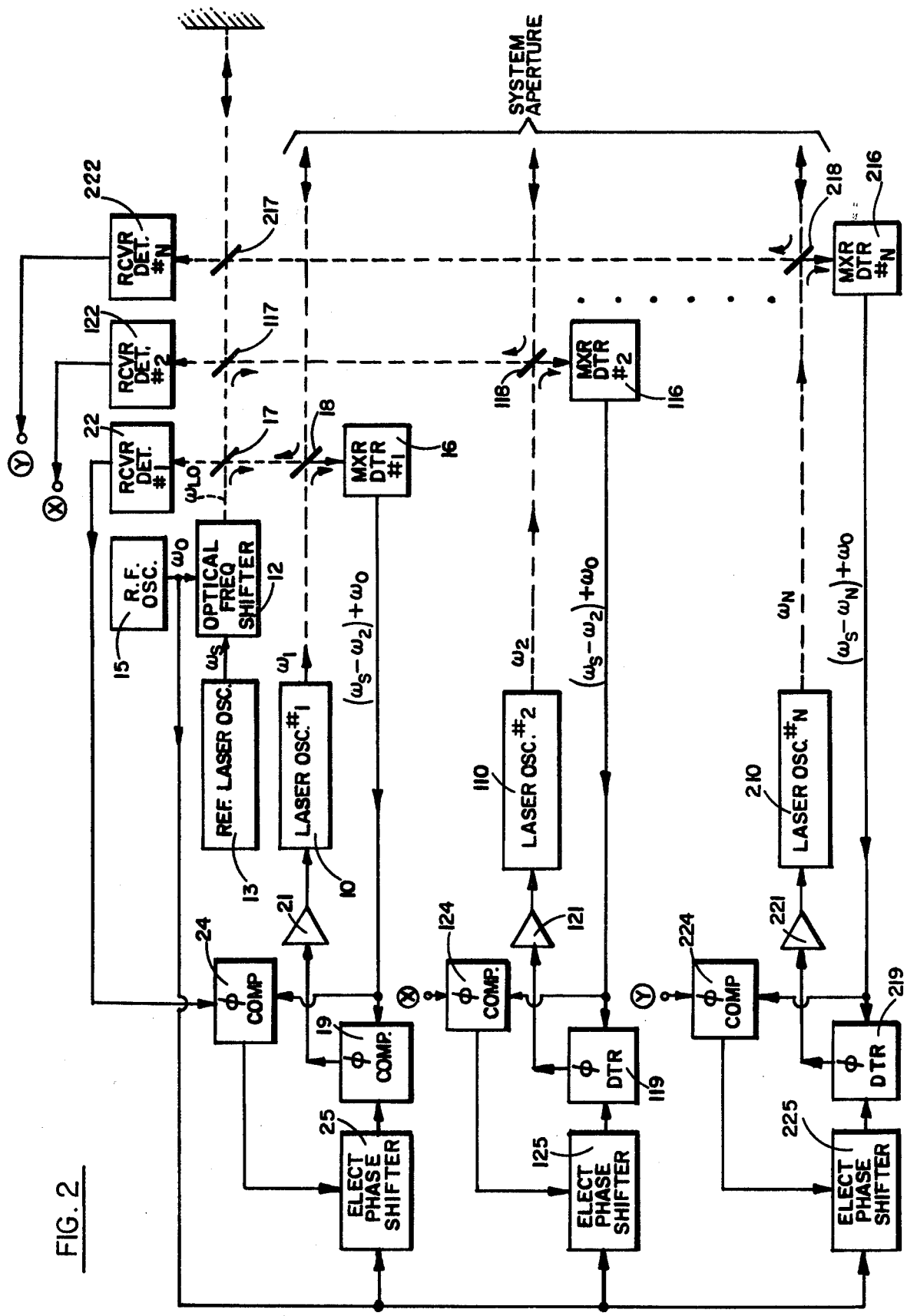
FIG. 2 is a block diagram of a system in which the concept of the invention may be advantageously employed.

An active (i.e., transmitting and receiving) system in which the concept of the arrangement of FIG. 1 is advantageously employed is shown in FIG. 2.

Referring to FIG. 2 there is shown in block diagram form a further embodiment of the invention. There is illustrated the phase-and-frequency locked transmitting array (laser oscillators 10, 110 and 210) of FIG. 1 in cooperation with beam splitters 18, 118 and 218 and comprising the first, second and last optical channels, respectively. In addition, there is further included a receiving system comprising a plurality of photoelectric detectors 22, 122 and 222, each in cooperation with a reflective mode of a respective one of beam splitters 17, 117 and 217 as to comprise a respective first, second and last receiving channel for responding to target reflections of the transmitted laser energy, received by the system aperture. The output of each of receiver-detectors 22, 122 and 222 is fed a first input of a mutually exclusive one of a like plurality of phase comparators 24, 124 and 224 is responsively coupled to the output of a respective one of first channel mixer-detector 16, second channel mixer-detector 116 and third channel mixer-detector 216 to provide an output indicative of a phase difference between the transmitted energy and the received reflections thereof in each channel.

There is further provided an electrical phase shifter 25, 125 or 225 interposed between the output of RF oscillator 15 and the associated input of first, second and third phase lock detector 19, 119 or 219, each of first, second and third channel phase shifter 25, 125 and 225 having a control input responsively coupled to that mutually exclusive one of phase comparators 24, 124 and 224 associated with such respective channel. In this way, any phase-front variation in the received signal is removed by compensatory adjustment of the transmitted phase front whereby maximum system sensitivity to target reflections and maximum range performance are enhanced.

Accordingly, there has been described means for phase-locking a plurality of independent lasers for increased illumination of the target, whereby the efficiency of such increased illumination is improved.

Although the invention has been disclosed and illustrated in detail, it is to be clearly understood that the same is by way of illustration and example only and is not to be taken by way of limitation, the spirit and scope of this invention being limited only by the terms of the appended claims.

I claim:
1. Apparatus for phase and frequency locking a first laser oscillator, comprising
an intermediate radio frequency ($\omega_o$) oscillator;
an electronically controlled light-beam frequency shifter interposed in the optical path of the output path of a reference laser and having a control input responsively coupled to the output of said radio frequency oscillator for providing a local oscillator output having a frequency $\omega_{LO}$ indicative of the sum ($\omega_s + \omega_o$) of the output frequencies of said reference oscillator ($\omega_s$) and of an output of said radio frequency oscillator ($\omega_o$);
photoelectric detector means responsive to both said local oscillator output and an output $\omega_1$ of said first laser oscillator for providing an electric signal output having a frequency (($\omega_s - \omega_1$) + $\omega_o$) indicative of the frequency difference between said inputs to said detector, synchronous comparator means having a first and second input a respective one of said output of said detector $((\omega_s - \omega_1) + \omega_o)$ and said radio frequency oscillator $\omega_o$ for providing an output signal indicative of the phase and frequency difference between the inputs applied to said comparator, a control input of said first laser oscillator being responsive to said output signal of said synchronous comparator.

2. In a multi-element array of laser oscillators, each having a control input for adjusting the operating laser light frequency thereof, apparatus for phase and frequency locking each of said array laser oscillators to a reference laser oscillator and comprising an intermediate frequency ($\omega_o$) radio oscillator, an electronically-controlled light beam frequency shifter interposed in the optical path of a reference laser and having a control input responsively coupled to the output of said radio frequency oscillator for providing a local oscillator output having a frequency ($\omega_{LO}$) indicative of the sum ($\omega_s + \omega_o$) of the output frequencies of said reference oscillator ($\omega_s$) and of said radio frequency oscillator ($\omega_o$);

a like plurality of photoelectric mixer-detectors as array laser oscillators, each detector responsive to both said local oscillator output ($\omega_{LO}$) and a mutually exclusive one of said outputs of said array laser oscillators ($\omega_i$) for providing a detected electrical signal output having a frequency $((\omega_s - \omega_i) + \omega_o)$ indicative of the frequency difference between said optical inputs to said mixer-detector means, a like plurality of synchronous comparators as array laser oscillators, each comparator responsive to an output of a mutually exclusive one of said mixer-detectors and of said radio frequency oscillator for providing an output signal indicative of the phase and frequency difference between the inputs applied to said comparator, a control input of that one of said array laser oscillators with which said mixer-detector responsively cooperates being responsive to said output signal of said synchronous comparator.

3. A multi-element array of phase-and-frequency locked laser oscillators comprising a reference laser oscillator;

a plurality of adjustable laser oscillators, each having a control input for adjusting the operating laser light phase and frequency thereof;

an intermediate radio frequency ($\omega_o$) oscillator;

an electronically-controlled light beam frequency shifter interposed in the optical path of said reference laser and having a control input responsively coupled to the output of said radio frequency oscillator for providing a local oscillator output having a frequency ($\omega_{LO}$) indicative of the sum ($\omega_s + \omega_o$) of the output frequencies of said reference oscillator (107 $_s$) and of said radio frequency oscillator ($\omega_o$);

a like plurality of photoelectric mixer-detectors as adjustable laser oscillators, each detector responsive to both said local oscillator output ($\omega_{LO}$) and a mutually exclusive one of said outputs of said adjustable laser oscillators ($\omega_i$) for providing a detected electrical signal output having a frequency $((\omega_s - \omega_i) + \omega_o)$ indicative of the frequency difference between said optical inputs to said mixer means, a like plurality of synchronous comparators as adjustable laser oscillators, each comparator responsive to an output of a mutually exclusive one of said mixer-detectors and of said radio frequency oscillator for providing an output signal indicative of the phase and frequency difference between the inputs applied to said comparator, a control input of that one of said adjustable laser oscillators with which said mixer-detector responsively cooperates being responsive to said output signal of said synchronous comparator.

4. Apparatus for phase and frequency locking a first laser oscillator and comprising a RF oscillator for providing an offset frequency $\omega_o$;

a laser local oscillator means responsive to the RF oscillator for providing a local oscillator frequency; and synchronous comparator means having a first input responsive to the frequency difference between said local oscillator frequency and an output of said first laser oscillator, and further having a second input responsive to the offset frequency output of said RF oscillator for providing an output indicative of the phase and frequency difference between the inputs applied thereto for control of said first laser oscillator.

5. The device of claim 4 in which said laser local oscillator means comprises stable reference laser oscillator having an output optical beam path; and an electronically-controlled light beam frequency shifter interposed in the output optical path of said reference laser oscillator and having a control input coupled to the output of said radio frequency oscillator for providing a local oscillator output having a frequency ($\omega_{LO}$) indicative of the sum ($\omega_s + \omega_o$) of the output frequencies of said reference oscillator ($\omega_s$) and said radio frequency oscillator (107 $_o$).

6. The device of claim 4 in which said synchronous comparator means comprises photoelectric mixer-detector means responsive to the laseroscillator output (107 $_{LO}$) and adapted to be responsive to the output of said first laser oscillator for providing a detected electrical signal output having a frequency $[(\omega_s - \omega_1)] + \omega_o$ indicative of the frequency difference between said optical inputs to said mixer means; and a synchronous comparator having a first input responsive to said output of said mixer-detector means and further having a second input responsive to the output of said RF oscillator for providing an output indicative of the phase and frequency difference between said inputs applied to said comparator.

7. The device of claim 5 in which said synchronous comparator means comprises photoelectric mixer-detector means responsive to the laser oscillator output ($\omega_{LO}$) and adapted to be responsive to the output of said first laser oscillator for providing a detected electrical signal output having a frequency $[(\omega_s - \omega_1)] + \omega_o$ indicative of the frequency difference between said optical inputs to said mixer means; and a synchronous comparator having a first input responsive to said output of said mixer-detector means and further having a second input responsive to the output of said RF oscillator for providing an output indicative of the phase and frequency difference between said inputs applied to said comparator.

* * * * *

UNITED STATES PATENT AND TRADEMARK OFFICE
CERTIFICATE OF CORRECTION

PATENT NO. : 4,096,448
DATED : June 20, 1978
INVENTOR(S) : Cecil L. Hayes

It is certified that error appears in the above-identified patent and that said Letters Patent are hereby corrected as shown below:

Column 5, line 2, after "input" insert ---responsive to---.

Column 5, line 57, change "107" to ---$\omega$---.

Column 6, line 36, change "107" to ---$\omega$---.

Column 6, line 40, change "laseroscillator" to ---laser oscillator---, change "107" to ---$\omega$---.

Signed and Sealed this

Twenty-first Day of November 1978

[SEAL]

Attest:

RUTH C. MASON
*Attesting Officer*

DONALD W. BANNER
*Commissioner of Patents and Trademarks*